United States Patent [19]

Baldwin et al.

[11] 4,068,051

[45] Jan. 10, 1978

[54] PROCESS FOR PREPARING CONJUGATED DIENE BUTYL

[75] Inventors: Francis P. Baldwin, Summit; James A. Rae, Cranford, both of N.J.

[73] Assignee: Exxon Research and Engineering Company, Linden, N.J.

[21] Appl. No.: 631,483

[22] Filed: Nov. 13, 1975

Related U.S. Application Data

[63] Continuation of Ser. No. 507,243, Sept. 18, 1974, abandoned.

[51] Int. Cl.$^2$ ................................................ C08F 8/26
[52] U.S. Cl. .......................................... 526/47; 526/17; 526/18; 526/48.1; 528/480; 528/486; 528/487; 528/488
[58] Field of Search ....................... 526/17, 18, 47, 48, 526/507, 243; 528/480, 486

[56] References Cited

U.S. PATENT DOCUMENTS

| | | | |
|---|---|---|---|
| 3,775,387 | 11/1973 | Baldwin | 260/85.3 |
| 3,816,371 | 6/1974 | Baldwin | 260/79.5 |
| 3,852,253 | 12/1974 | Malatesta | 526/27 |

*Primary Examiner*—Christopher A. Henderson
*Attorney, Agent, or Firm*—A. Lagani; J. J. Mahon

[57] ABSTRACT

Improved processes for the dehydrohalogenation of halogenated butyl rubber in order to prepare a butyl rubber having randomly distributed sites of conjugated unsaturation are disclosed. Such processes, which include the contacting of a solution of halogenated butyl rubber with a soluble metal carboxylate, a soluble carboxylic acid, and an oxide or hydroxide of a metal selected from Groups Ia and IIa of the Periodic Table, are carried out in a reaction zone which is maintained substantially free of free water vapor. Preferably, excess amounts of hydrophilic reagents are added to the reaction zone or in the alternative the reaction zone is purged with a drying gas.

1 Claim, No Drawings

PROCESS FOR PREPARING CONJUGATED DIENE BUTYL

This is a continuation, of application Ser. No. 507,243, filed 9/18/74, now abandoned.

FIELD OF THE INVENTION

The present invention relates to improved processes for preparing butyl rubber containing conjugated diene unsaturation.

BACKGROUND OF THE INVENTION

Due to the relatively limited amount of unsaturation present in commercial butyl rubber, including the commercially significant halogenated butyl rubbers, attempts have recently been made to prepare butyl rubbers containing a greater degree of unsaturation. These attempts culminated in the significant discovery that the dehydrohalogenation of halogenated butyl rubber produces a butyl rubber containing conjugated diene unsaturation. This significant discovery, which has proven to have a substantial impact upon the elastomer business, is embodied in two recent U.S. patent applications; namely, Ser. No. 228,728, filed Feb. 23, 1972 in the name of Francis P. Baldwin now U.S. Pat. No. 3,775,387 issued Nov. 27, 1973, directed to a process for preparing such conjugated diene butyl, and Ser. No. 228,727 also filed on Feb. 23, 1972, in the name of Francis P. Baldwin and Alberto Malatesta, now U.S. Pat. No. 3,816,371 issued June 11, 1974 directed to the conjugated diene butyl produced thereby, both of which are assigned to Esso Research and Engineering Company, the assignee of the present application. While specific portions of the disclosures of both of these applications will be referred to herein, these applications are incorporated herein by reference, particularly with respect to the teachings regarding the specific processes for producing such significantly improved butyl rubbers.

The butyl rubber containing conjugated unsaturation which is taught in these applications may be represented by the general formula:

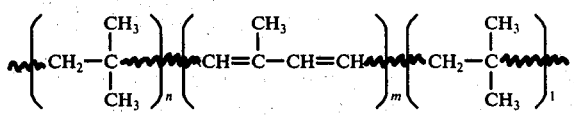

where $n + 1$ represents the number of isoolefin units incorporated in the butyl rubber, and $m$ represents the number of initial diolefin units present, substantially as isolated units. Furthermore, as also described therein, other structures can be present, and, indeed, they may predominate. For example, when the precursor halogenated butyl has the structure:

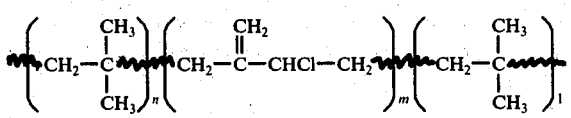

the following structure will be present:

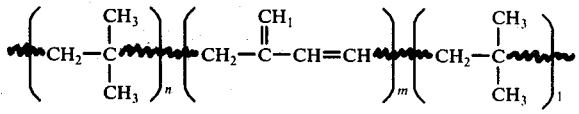

These products thus represent a composition of matter comprising a copolymer consisting of from 85 to 99.5% by weight of an isoolefin having from 4 to 7 carbon atoms, combined with 15 to 0.5% by weight of a conjugated diolefin having from about 4 to 14 carbon atoms, containing conjugated diene unsaturation. Preferably, the composition comprises a copolymer of isobutylene and isoprene, a major portion of the isoprene units combined therein having conjugated diene unsaturation. In addition, the various structures possible regarding these compositions are set forth in copending application Ser. No. 465,479, filed 4/30/74, incorporated herein by reference.

As stated above, the revelation of these processes for preparing butyl rubbers containing such conjugated diene unsaturation has had a significant impact upon this industry.

Methods for improving upon these processes have, however, been deemed most desirable.

SUMMARY OF THE INVENTION

It has now been discovered that such processes for producing butyl rubbers containing conjugated diene unsaturation through the dehydrohalogenation of halogenated butyl rubber may be improved upon when carried out in a reaction zone which is maintained substantially free of water. Thus, when such processes are conducted in the presence of less than about 1 mole of water per mole of dehydrohalogenating reagent present in the reaction system, it has been found that it is then possible to produce a product having a reduced halogen content, preferably below about 0.4 weight percent, and that such reduced halogen contents can be obtained in significantly shorter periods of time than is possible when this reaction is carried out in the presence of substantial amounts of water vapor.

These improved processes for preparing conjugated diene-containing butyl rubber comprise contacting a solution of halogenated butyl rubber, in a reaction zone, with from about 0.05 to 0.5 moles of a soluble metal carboxylate per gram atom of halogen present where the metal is selected from the metals of Groups Ib, IIb, IVa and VIII of the Periodic Table, from about 0 to 2 moles of a soluble carboxylic acid per gram atom of halogen in the halogenated butyl rubber, and an oxide, hydroxide or carboxylate of a metal selected from Groups Ia and IIa of the Periodic Table, per gram atom of halogen in the halogenated butyl rubber, while maintaining the reaction zone substantially free of water. In one embodiment, the reaction zone is maintained substantially free of water by adding an excess of a hydrophilic substance thereto. Thus, in this embodiment, from between about 2 to 10 moles of the oxide of a metal selected from Group IIa of the Periodic Table is employed, preferably greater than about 1 mole for each mole of water initially present in the system and/or formed in the reaction zone.

The improved processes of the present invention result in the preparation of the highly valuable conjugated diene butyl rubber described in said Ser. No. 228,727. When the reaction zone is maintained substantially free of water vapor, as will be described in more detail below, such conjugated diene butyl rubbers are produced having reduced halogen contents of below about $1.1 \times 10^{-2}$ gram atoms of halogen per 100 grams of polymer, and in reduced reaction time periods.

DETAILED DESCRIPTION

Halogenated butyl rubber is commercially available and may be prepared in the manner described in said Ser. No. 228,728, now U.S. Pat. No. 3,775,387, which preparation is incorporated herein by reference. This method comprises halogenating butyl rubber in a solution containing 1 to 60% by weight butyl rubber in a substantially inert $C_5$-$C_8$ hydrocarbon solvent, and contacting this butyl rubber cement with a halogen gas for from 2 to 25 minutes. Such halogenated butyl rubbers, including both chlorinated and brominated butyl rubbers, which contain between 0.5 and 10% halogen, are suitable for use in this invention.

Illustrative of the halogenated butyl rubbers which may be used herein is Enjay butyl HT10-68 (a chlorinated butyl rubber prepared from a butyl rubber having approximately 1.8 mole percent unsaturation and a viscosity average molecular weight of about 450,000). However, for the purposes of this invention, it is preferred that the butyl rubber starting material have incorporated therein from about 0.5 to 6 mole percent of combined diolefin, preferably from 0.5 to 3 mole percent, e.g. about 2 mole percent.

The preferred method of preparing the conjugated diene-containing polymers described in Ser. No. 228,728 comprises heating a solution of the halogenated polymer in the presence of a soluble metal carboxylate dehydrohalogenating reagent. Suitable metals are the polyvalent metals of Groups I$b$, II$b$, IV$a$ and VIII of the Periodic Table, having a relatively high first ionization potential and whose halides are soluble in a hydrocarbon reaction medium at the reaction temperature. Typical of these are zinc, iron, mercury, nickel, copper, tin and cadmium carboxylates.

The halogenated butyl rubber is first dissolved in a suitable organic solvent such as a $C_5$-$C_8$ substantially inert hydrocarbon, including pentane, hexane, heptane, mineral spirits, cyclohexane, toluene, benzene, xylene, and mixtures thereof. To the halogenated butyl rubber solution is added the metal carboxylate, carboxylic acid and the oxide or hydroxide of the Group I$a$ or II$a$ metal. The reactor containing these ingredients is then heated, usually at a temperature below about 200° C. depending upon the particular solvent used and the ceiling temperature below which the polymer is soluble, the residence time and ingredient concentrations present. Generally, suitable temperatures for the reaction range from between 100° to 200° C.

The reaction period may be for a period of time ranging from 0.1 to about 10 hours, depending on composition of the copolymer (i.e. brominated or chlorinated), concentration of the ingredients present in the reaction zone, the level or degree of dehydrohalogenation desired, temperature, or any combination of these variables. Preferably, the time for essentially complete conversion to the conjugated diene product is from about 0.2 to about 4 hours.

The reaction is carried out in the substantial absence of free water vapor. Thus, the reactor fluid should contain below about 2 moles of water per mole of metal carboxylate dehydrohalogenating reagent, and preferably below about 1 mole of water per mole of reagent. This can be accomplished by the inclusion of a hydrophilic substance in the reactor, and one which does not interfere with the above-noted reaction. Thus, such desiccants as calcium sulfate, magnesium sulfite, various acid anhydrides, as well as the oxides of the metals of Group II$a$ of the Periodic Table, and preferably the alkaline earth oxides, such as calcium and magnesium oxide, may be employed for these purposes. Thus, in the latter case, while the presence of such oxides in the reaction mixture was previously known, it has been found that the maintenance of the reactor substantially free of free water vapor may best be accomplished by including at least 1 mole of these oxides per mole of water initially present in the system and formed as a result of the overall dehydrohalogenation reaction. Also, if the system is initially dry, then at least 1 mole of metal oxide per gram atom of halogen present in the polymer may be employed in combination with a metal hydroxide, preferably calcium or magnesium hydroxide.

Among the soluble metal carboxylates which may be employed, the soluble carboxylic acid salts of zinc (e.g., zinc salts of napthenic or aliphatic carboxylic acids) are especially useful. While useful in preparing the compositions of the present invention, potential toxicity problems which could be encountered in practicing the present invention might limit the use of certain metals, such as cadmium and mercury salts, for example, and the soluble carboxylates of iron, nickel and copper, for example, are known to be catalysts for oxidation.

Zinc carboxylate is the most preferred dehydrohalogenating reagent in the present invention. However, in dehydrohalogenating the halogenated butyl rubber according to the present invention zinc chloride is thought to be a by-product of the reaction. Zinc chloride, being an effective Friedel-Crafts type catalyst, may lead to molecular weight degradation or crosslinking of the halogenated polymers, depending on the structure of the polymer, the particular solvent utilized, etc. Furthermore, the presence of metal halides such as zinc chloride in the reaction mixture makes that mixture overly acidic, in which case the kinetic balance between the reactions occurring therein can no longer be maintained.

These difficulties are overcome in the present invention by having present in the reaction zones specific amounts of metal oxides and/or hydroxides, whose halogen salts are insoluble in the reaction medium. These are generally the oxides and/or hydroxides of the metals of Groups I$a$ and II$a$, and preferably calcium or magnesium, most preferably calcium. Thus, when sufficient alkaline earth oxide and/or hydroxide is present, the reaction kinetics can be easily maintained. While not wishing to be bound by any specific theory therefore, it appears that the amount of surface area presented by the given quantity of alkaline earth oxide and/or hydroxide is significant in this respect.

One result of reaction imbalance leading to high Lewis acid (e.g. $ZnCl_2$) acidity is isomerization of the conjugated diene formed, resulting in a lower yield of the Diels-Alder active diene structures. Since the production of regenerator carboxylate involves reaction of a soluble carboxylic acid with an insoluble metal oxide or hydroxide, the importance of total surface area available is apparent.

It is also thought that the process of the present invention proceeds by the following series of reactions (Zn is used to represent the metals of Groups Ib, IIb, IVa and VIII):

Dehydrohalogenation by Zinc Carboxylate

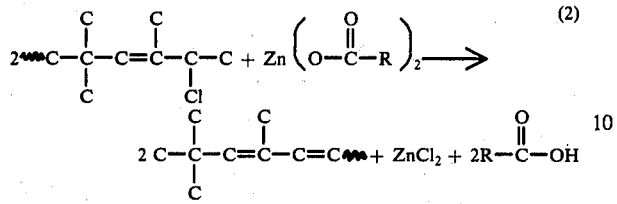

ii. Generation of Alkali or Alkaline Earth Carboxylate

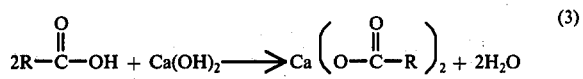

iii. Regeneration of Zinc Carboxylate and Elimination of Zinc Halide

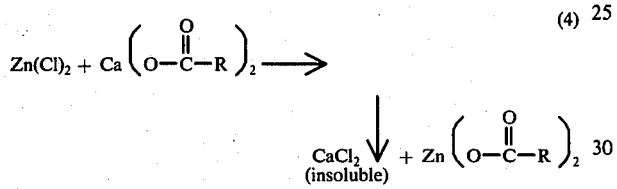

Thus, by this series of reactions, the zinc carboxylate, effective in dehydrohalogenation, perhaps by a concerted 6-membered ring mechanism route as depicted below:

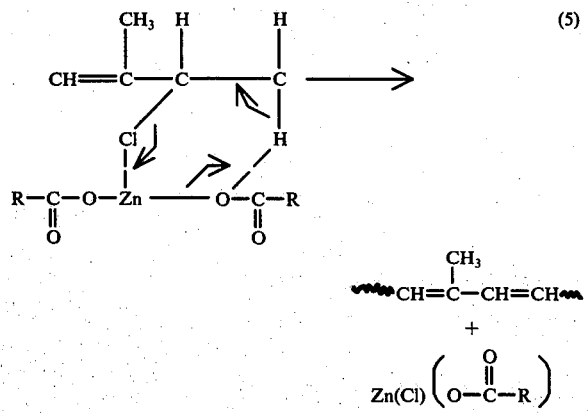

can be regenerated by the metal carboxylate regenerator, the net overall reaction in terms of transformation of materials being

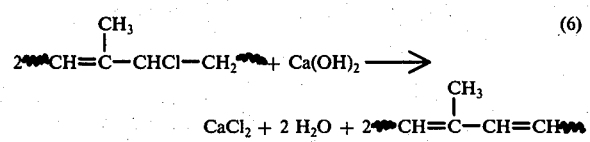

It has also been observed that reaction 2 (or 5) does not occur exclusively. In such reactions there is thought to be competition between the elimination and the substitution routes, the former producing the conjugated diene containing polymer, the latter an allylic ester containing polymer as indicated below:

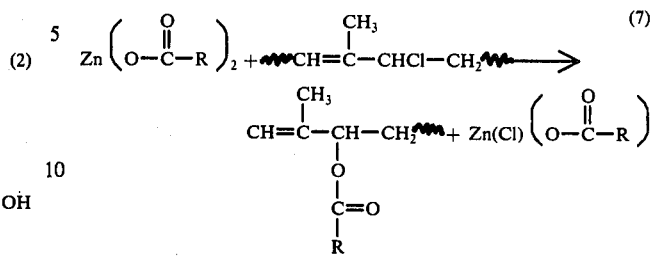

For the purpose of this invention, reaction 7 must be repressed.

The conjugated diene-containing butyl rubbers of this invention may be cured by a variety of methods, as taught in Ser. No. 228,728, which also is incorporated herein by reference, as are the methods of covulcanizing these rubbers with other general purpose rubbers.

Suitable carboxylic acids, useful in the present invention are $C_5$ to $C_{13}$ monocarboxylic acids known as Neo Acids (Enjay Chemical Co.), which are trialkyl acetic acids, e.g. Neopentanoic acid (trimethyl acetic acid); Neo-heptanoic acid (dimethyl n-propyl acetic acid); Neo-decanoic acid; and mixtures of the trialkyl acetic acids having 5 to 13 carbon atoms. Other monocarboxylic acids useful in this invention are the aliphatic and naphthenic carboxylic acids having about 2 to 20 carbon atoms, a ring-substituted aromatic carboxylic acid. Among the most preferred are 2-ethylhexanoic and naphthenic acids. The salt and acid, used in this method, generally are but need not be the same, e.g. if the naphthenate of Group IIb metal is used, it would usually be used in conjunction with naphthenic acid.

While it is believed that virtually any carboxylic acid would be suitable in the present invention for use with the metals of Groups Ib, IIb, IVa and VIII of the Periodic Table, the acid should be chosen so that the metal salt is soluble in the hydrocarbon solvent used to dissolve the polymer and at the reaction temperature employed.

Preferably then, the carboxylic acids should be of such nature that the formation of crystallites of the metal salt is unlikely, or if crystallites are formed, they have relatively low heats of fusion or high entropies of fusion, therefore low melting points.

Recovery of the converted halogenated butyl can be accomplished by precipitation in acetone or some other suitable hydrocarbon material, such as an alcohol, or solvent stripping with steam and hot water and subsequently dried. This method of producing conjugated diene butyl (sometimes referred to herein as CDB) provides for removal of up to 90%, and more, of the halogen present in the halogenated butyl rubber being converted, generally in from 0.2 to about 4 hours.

It is to be noted that one of the products of the overall reaction is water, and we have now discovered that the presence of substantial amounts of water tends to retard the dehydrohalogenation reaction, possibly as a result of hydrolysis reactions leading to a diminution in the amount of dehydrohalogenating reagent present and a concurrent increase in the amount of regenerator carboxylate present. If this occurs, complex salts can form, and these are apparently not effective in dehydrohalogenation. To illustrate this point, dehydrohalogenation experiments were run in which the effect of excess regenerator,

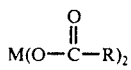

was noted, where M represents one of the metals discussed above.

EXAMPLE 1

The jacket of a one-liter jacketed reactor, fitted with a stirrer and condensers on both the jacket and reactor, was charged with toluene, and the reactor was charged with 308 grams of toluene cement (35 grams of polymer) comprising commercial chlorinated butyl HT-1068. This commercial elastomer contains about 1.5 grams of calcium stearate per 100 grams of polymer. The ingredients shown in Table I were added to the charged reactor, the reaction zone was blanketed with nitrogen, and heat was applied to the jacket to cause the toluene to reflux. The reactor is thus heated with toluene vapor and when the toluene in the jacket began to reflux, a clock was started. At this point, the material in the reactor was at a temperature of about 70° C., and it reached a temperature of 107° C. in about 15 minutes after jacket reflux had commenced. After one hour, heating was stopped, and the reaction was quenched by the addition of chilled solvent at about −70° C. The reactor contents were then placed in a separatory funnel, washed once with dilute sulfuric acid, and twice with fresh water, both containing a small amount of isopropyl alcohol to facilitate settling. The washed cement was then added slowly to a stirred vessel containing acetone, and the polymer precipitated, collected and dried in a vacuum oven. All samples were analyzed for the percentage of chlorine present. These results are tabulated in the Table I, and they clearly demonstrate that the dehydrohalogenation reaction is slowed when the regenerator metal carboxylate concentration approaches or exceeds the concentration of metal carboxylate dehydrohalogenating agent present, in this example zinc 2-ethylhexanoate. It is hypothesized that this occurs as a result of complex salt formation, as follows:

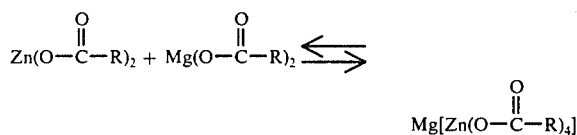

the equilibrium being shifted in one direction or the other as a function of solvent type, temperature, etc.

In the experiments of Example 1, any moisture generated or initially present was ejected in the open vapor space above the reaction liquid to condense on the unheated reactor top or was consumed in the conversion of Mgo to Mg(OH)$_2$. The reaction thus proceeded to substantial completion in approximately 1 hour for those systems only slightly disturbed by added magnesium 2-ethylhexanoate (Run 1-3).

TABLE I
EFFECT OF EXCESS REGENERATOR CARBOXYLATE ON DEHYDROHALOGENATION REACTION

| Ingredients (grams) | Run #1 | Run #2 | Run #3 | Run #4 | Run #5 |
|---|---|---|---|---|---|
| Polymer | 35.0 | 35.0 | 35.0 | 35.0 | 35.0 |
| Zinc 2-ethylhexanoate | 1.4 | 1.4 | 1.4 | 1.4 | 1.4 |
| Magnesium Oxide | 0.7 | 0.7 | 0.7 | 0.7 | 0.7 |
| Magnesium 2-ethylhexanoate | — | 0.35 | 0.7 | 1.4 | 4.2 |
| % Cl in Polymer | | | | | |
| Original | 1.13 | 1.13 | 1.13 | 1.13 | 1.13 |
| Reaction Product | 0.08 | 0.10 | 0.11 | 0.80 | 0.90 |

EXAMPLE 2

Another set of experiments was carried out, utilizing the same apparatus and overall procedures as described above with respect to Example 1. This example, which generated the data contained in Table II, was also designed to show the effect of water, presumably in upsetting the balance between active dehydrohalogenating agent and regenerator metal carboxylate.

In run #6 all of the ingredients, including the 0.6 ml water, were added to the stirred cement and the system was gently agitated at room temperature, i.e. approximately 25° C. for about 18 hours before heat was applied to the jacket. Thus, a considerable amount of time was provided for any hydrolysis reaction to take place. In this instance, however, after the one hour reaction at jacket reflux very little dehydrohalogenation occurred.

In run #7, the water was added just as heat was being applied to the jacket. Here dehydrohalogenation did occur to a somewhat greater extent, but still unsatisfactorily.

In run #8, the cement in the reactor was heated to 107° C. to drive off any moisture present, the contents were cooled by immersion of the bottom half of the reactor jacket in ice and water. After cooling, the ingredients shown in Table II were added, and the reaction was carried out in the manner previously described. In this case, a satisfactory level of dehydrohalogenation took place.

These experiments along with those of Example 1, demonstrate that the presence of significant amounts of moisture retards dehydrohalogenation and they also suggest a possible mechanism by which this occurs.

Table II
EFFECT OF WATER ON DEHYDROHALOGENATION OF CHLORINATED BUTYL

| Ingredients (grams) | Run #6 | Run #7 | Run #8 |
|---|---|---|---|
| Polymer | 35.0 | 35.0 | 35.0 |
| Water | 0.6 | 0.6 | — |
| Magnesium Oxide | 0.7 | 0.7 | 0.7 |
| Zinc 2-ethylhexanoate | 0.7 | 0.7 | 0.7 |
| | (all ingredients charged and stored overnight) | (all ingredients charged just before heatup) | (cement dried by preheating before other ingredients added) |
| % Cl in Polymer | | | |
| Original | 1.13 | 1.13 | 1.13 |
| Reaction Product | 0.99 | 0.71 | 0.18 |

EXAMPLE 3

Another set of experiments was carried out to explore dehydrohalogenation of a commercial brominated butyl rubber, Polysar X2. The same apparatus and general procedure as previously described was again employed, except that xylene was charged to the jacket, and the elastomer was dissolved in xylene (100 grams of polymer in 940 grams of xylene). These reactions were thus run at 132 to 135° C.

Instead of quenching each reaction at the end of 1 hour of jacket reflux, the heating mantle was removed and the reactor was allowed to cool at that point. When the reactor had cooled, a 75 milliliter sample of solution was withdrawn, diluted with hexane, washed, the polymer was collected and analyzed as in the previous examples.

The materials charged to the reactor and the data which was obtained are shown in Table III. These experiments thus further demonstrate that the presence of significant amounts of moisture is deleterious to the dehydrohalogenation reaction but that when moisture is removed, either by continuously flushing the reactor contents with nitrogen (Run #11) or by adding sufficient calcium oxide to react with all the water present or formed, $CaO + H_2O \rightarrow Ca(OH)_2$, (Run #13), the reaction proceeded rapidly.

TABLE III
EFFECT OF WATER ON DEHYDROHALOGENATION OF BROMINATED BUTYL

| Ingredient (grams) | Run #9 | Run #10 | Run #11 | Run #12 | Run #13 |
|---|---|---|---|---|---|
| Polymer | 50.0 | 50.0 | 50.0 | 50.0 | 50.0 |
| Xylene | 470.0 | 470.0 | 470.0 | 470.0 | 470.0 |
| Water | 5.0 | 1.0 | — | 1.0 | 1.0 |
| Ca(OH)$_2$ | 1.35 | 1.35 | 1.35 | 1.35 | 0.6 |
| Zinc Naphthenate | 2.0 | 2.0 | 2.0 | 2.0 | 2.0 |
| Naphthenic Acid | 0.5 | 0.5 | 0.5 | 0.5 | 0.5 |
| di(t-butyl)-p-cresol (antioxidant) | 0.03 | 0.03 | 0.03 | 0.03 | 0.03 |
| CaO | — | — | — | — | 4.0* |
| | | | (N$_2$ flush through dip tube) | | |
| % BR in Polymer | | | | | |
| Original | 2.05 | 2.05 | 2.05 | 2.05 | 2.05 |
| Reaction Product | 1.32 | 0.43 | 0.14 | 0.47 | 0.03 |

*1 gram of H$_2$O   3.11 gram of CaO for reaction CaO + H$_2$O→Ca(OH)$_2$

EXAMPLE 4

By way of illustration of how this invention might be used in a practical manner, the following hypothetical illustration is presented.

A 14 wt. % cement is delivered from the settler after the final washing step subsequent to chlorination and contains 800 ppm of dissolved and entrained water. Thus, 100 pounds of elastomer would be present in about 715 pounds of cement containing 0.67 pounds of water. This would then require approximately 2.1 pounds of calcium oxide to remove this amount of water via the formation of calcium hydroxide.

Typically, the 100 pounds of elastomer would contain about 1.2 pounds of chlorine, and the overall dehydrohalogenation reaction would then generate about 0.61 pounds of water, whose quantitative removal would require about 1.9 pounds of calcium oxide.

In general, then, when employing the wet cement described above, 4 pounds of CaO per 100 pounds of polymer would be theoretically sufficient to maintain the desired state of dryness during the dehydrohalogenation reaction. To account for impurities and the difficulty for moisture to penetrate the solid CaO particles, however, a 25 to 50% excess (over this theoretical amount) of CaO may be employed, and where the delivered cement contains more than the 800 ppm of water assumed above, and where the elastomer contains a greater amount of halogen, appropriately higher amounts of CaO may be employed. Thus, in the example cited above, there would be employed at least 2.1 moles of CaO per gram atom of chlorine present in 100 grams of polymer. Other desiccants can, of course, be employed but calcium oxide is a preferred material since it not only provides for desiccation but, along with the hydroxide formed during the reaction, it also participates in the dehydrohalogenation reagent regeneration process. Moreover, it is readily available and inexpensive.

Any compound which reacts with water in such a manner that none of the reaction products have an adverse effect on the dehydrohalogenation process may be used as the desiccant. Illustrative examples of such compounds are orthoformate esters and alkoxides of aluminum and titanium. These desiccants operate in the following manner:

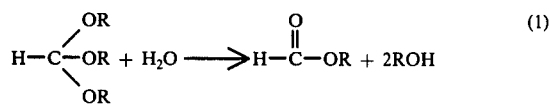
(1)

wherein H—C—(OR)$_3$ represents the orthoformate ester and R is alkyl; preferably R is C$_1$-C$_{40}$ alkyl; and

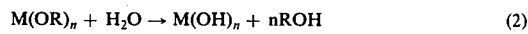
(2)

wherein M is Al or Ti; R is hydrocarbyl, e.g. alkyl, phenyl, etc.; and n is the valence of the metal, i.e. 3 or 4. Preferably R is C$_1$ to C$_4$ alkyl.

The term "substantially free of water" as used in the specification and claims means an amount of water which is less than one mole of water per mole of dehydrohalogenating reagent employed in the dehydrohalogenation reaction.

The term "inert gas" as used in the specification and claims in describing suitable purging gases for maintaining the reaction zone substantially free of water means any material which (1) is a gas at the temperature of the reaction zone, and (2) will not react with any of the reactants or products used or formed in carrying out this invention. Illustrative examples of such inert gases are nitrogen, hydrogen, ethane, butane, methylchloride, carbon dioxide, etc.

What is claimed is:

1. In a process for preparing a copolymer comprising an isoolefin containing from 4 to 7 carbon atoms and a conjugated multi-olefin containing from 4 to 14 carbon atoms, wherein a major portion of said conjugated multiolefin has conjugated diene unsaturation, said process comprising contacting a solution of halogenated butyl rubber, in a reaction zone, with from about 0.05 to 0.5 moles of a soluble metal carboxylate per gram atom of halogen present in the halogenated butyl rubber, said metal being selected from the metals of Groups Ib, IIb, IVa and VIII of the Periodic Table, from about 0 to 2 moles of a carboxylic acid per gram atom of halogen in said halogenated butyl rubber present in said reaction zone, and an oxide, hydroxide or carboxylate of a metal selected from the metals of Groups Ia and IIa of the Periodic Table per gram atom of halogen in the halogenated butyl rubber present in said reaction zone, the improvement which comprises maintaining said reaction zone substantially free of water by continuously purging said reaction zone with a drying gas, the drying gas being nitrogen, or by adding to said reaction zone, in addition to said dehydrohalogenation reagent, 2 to 10 moles of a hydrophilic agent per gram atom of halogen present in said halogenated butyl rubber, said hydrophilic agent being calcium oxide, such that the quantity of water maintained in said reaction zone is less than about 2 moles of water per mole of dehydrohalogenation reagent, said copolymer having a residual halogen content below $1.1 \times 10^{-2}$ gram atoms of halogen per 100 grams of polymer, said process being carried out between 0.2 to 4 hours.

* * * * *

UNITED STATES PATENT OFFICE
CERTIFICATE OF CORRECTION

Patent No. 4,068051          Dated January 10, 1978

Inventor(s) Francis P. Baldwin & James A. Kae

It is certified that error appears in the above-identified patent and that said Letters Patent are hereby corrected as shown below:

In the claims, column 10, lines 67 and 68, after the phrase "Periodic Table", delete the phrase "per gram atom of halogen in the halogenated butyl rubber present in said reaction zone".

Signed and Sealed this

Thirteenth Day of June 1978

[SEAL]

Attest:

RUTH C. MASON
*Attesting Officer*

DONALD W. BANNER
*Commissioner of Patents and Trademarks*